(12) United States Patent
Schurle

(10) Patent No.: US 9,816,255 B2
(45) Date of Patent: *Nov. 14, 2017

(54) SANITARY FIXTURE, INNER-HOSE ARRANGEMENT FOR A SANITARY FITTING, AND SANITARY FITTING

(71) Applicant: Neoperl GmbH, Mullheim (DE)

(72) Inventor: Holger Schurle, Mullheim (DE)

(73) Assignee: Neoperl GmbH, Müllheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/207,988

(22) Filed: Jul. 12, 2016

(65) Prior Publication Data

US 2016/0319525 A1 Nov. 3, 2016

Related U.S. Application Data

(63) Continuation of application No. 14/199,232, filed on Mar. 6, 2014, now Pat. No. 9,416,521.

(30) Foreign Application Priority Data

Mar. 8, 2013 (DE) .................... 20 2013 002 188 U

(51) Int. Cl.
F16K 11/14 (2006.01)
E03C 1/04 (2006.01)
F16K 11/00 (2006.01)
F16K 27/04 (2006.01)

(52) U.S. Cl.
CPC ............ *E03C 1/0404* (2013.01); *F16K 11/14* (2013.01); *F16K 19/006* (2013.01); *F16K 27/044* (2013.01); *Y10T 137/6014* (2015.04)

(58) Field of Classification Search
CPC ........... E03C 1/0404; E03C 1/04; F16K 11/14
See application file for complete search history.

(56) References Cited

U.S. PATENT DOCUMENTS

| 4,682,626 A | 7/1987 | Bergmann |
| 5,320,129 A | 6/1994 | Bosio |
| 7,819,137 B2 | 10/2010 | Nelson et al. |
| 8,469,056 B2 | 6/2013 | Marty et al. |

(Continued)

FOREIGN PATENT DOCUMENTS

| DE | 3112614 | 1/1982 |
| DE | 8507838 | 6/1985 |

(Continued)

*Primary Examiner* — Kevin Lee
(74) *Attorney, Agent, or Firm* — Volpe and Koenig, P.C.

(57) ABSTRACT

A sanitary fixture having a connector assembly which includes an adapter piece is provided for connection to a single-lever mixing cartridge. A pivotable connector piece having a hose connector is pivotably mounted between the base plate and the adapter piece. The base plate includes receptacles for a cold-water hose end piece and a warm-water end piece. The connector piece has an inner duct which, at a first end, opens out to the connector assembly and, at a second end, opens out to the hose connector. The connector piece is connected via a plug-in connection to a connector-piece receptacle of the adapter piece. The connector-piece receptacle opens out into a connection duct of a first type, which extends in the adapter piece crosswise to a connection duct of a second type in the adapter piece.

17 Claims, 12 Drawing Sheets

(56) References Cited

U.S. PATENT DOCUMENTS 8,584,697 B2    11/2013  Hsu
8,991,425 B2     3/2015  DeVries et al.
9,416,521 B2 *  8/2016  Schurle .................... E03C 1/04

FOREIGN PATENT DOCUMENTS

| DE | 10052500 | 4/2002 |
| EP | 2112281 | 10/2009 |
| EP | 2497866 | 9/2012 |

* cited by examiner

SANITARY FIXTURE, INNER-HOSE ARRANGEMENT FOR A SANITARY FITTING, AND SANITARY FITTING

The present application is a continuation of U.S. patent application Ser. No. 14/199,232, filed Mar. 6, 2014, now U.S. Pat. No. 9,416,521.

INCORPORATION BY REFERENCE

The following documents are incorporated herein by reference as if fully set forth: U.S. patent application Ser. No. 14/199,232, filed Mar. 6, 2014, now U.S. Pat. No. 9,416,521; and German Patent Application No. DE 102013002188.8, filed Mar. 8, 2013.

BACKGROUND

The invention relates to a sanitary fixture having a base plate which has a first receptacle for a cold-water hose end piece and a second receptacle for a warm-water hose end piece, wherein a connector assembly is configured for connecting a single-lever mixing cartridge.

Sanitary fixtures of this type are known and are used in a sanitary fitting to connect to one another the supply hoses, the single-lever mixing cartridge and an outlet mouthpiece arranged on a connection hose.

The invention further relates to an inner-hose arrangement for a sanitary fitting.

Inner-hose arrangements for sanitary fittings are known and employed for avoiding direct contact between the running water and a metallic surface of the sanitary fitting.

The invention finally relates to a sanitary fitting having a single-lever mixing cartridge, a first receptacle for a cold-water hose end piece and a second receptacle for a warm-water hose end piece and an outlet mouthpiece.

Sanitary fittings of this type are known and often have a pivot arm for pivoting the outlet mouthpiece.

SUMMARY

The invention is based on the object of making it possible for an inner-hose arrangement to be employed in a sanitary fitting having a single-lever mixing cartridge.

For the achievement of this object, the invention provides a sanitary fixture of the type described at the outset, having a connector piece, which has an inner duct which, at a first end, opens out to the connector assembly and, at a second end, opens out to a hose connector, is pivotably fastened on the base plate. It is of advantage here that, for employment in a sanitary fitting, the sanitary fixture is disposed with a pivot arm on which an outlet mouthpiece is fastened. This is because the pivotable fastening of the connector piece makes possible a movement of the pivot arm when the single-lever mixing cartridge is being held in position.

In one embodiment of the invention, it may be provided that the inner duct is routed at an angle between the first end and the second end. It is advantageous here that a pivot axis can be defined by one end of the connector piece, about which pivot axis the other end of the connector piece can be pivoted. Due to this the hose connector can retrace a pivoting movement of a pivot arm. The pivotable configuration of the connector piece has the further advantage that an excess length of a connection hose which is connected to the hose connector can be accommodated in that the connector piece is pivoted so as to be outside of the direct line of connection to an outlet mouthpiece.

In one embodiment of the invention it may be provided that a plug which, together with a matching plug receptacle of the base plate, forms a pivot bearing is configured on the connector piece. It is of advantage here that a simple pivotable fastening is formed. It is favorable here for the plug to be configured in an extension of the first end. Thus, the first end defines a pivot axis, and it can be achieved that the first end remains stationary during pivoting. On account of this, a tight connection of the connector piece on the connector assembly is possible. The plug is preferably provided with a latching cam in order to be retained in a form-fitting manner in the plug receptacle. It may be provided here that the plug is configured in a slotted manner in order to be able to release this form-fitting connection.

In one embodiment of the invention it may be provided that the plug receptacle is aligned parallel to a longitudinal axis of the fixture. It is of advantage here that the connector piece is easily insertable into the plug receptacle, since the direction of assembly of the sanitary fixture is typically established by its longitudinal axis.

In one embodiment of the invention it may be provided that an adapter piece having, on a first side, a base-plate receptacle for the base plate is configured. The adapter piece is thus arrangeable between the base plate and the single-lever mixing cartridge. It is of advantage here that the connector assembly can be executed as a standardized interface for a single-lever mixing cartridge. It is furthermore of advantage here that adapting to individual single-lever mixing cartridges merely requires a modification in the adapter piece, such that the remaining parts of the sanitary fixture can remain unchanged. The connector assembly is preferably configured to be planar in order to be connectable to commercially available single-lever mixing cartridges.

Connectivity to a single-lever mixing cartridge is implementable in that the connector assembly has three connector openings which are configured and arranged in a matching manner to three corresponding connector openings of the single-lever mixing cartridge.

In one embodiment of the invention it may be provided that the connector piece, in a connector region containing the first end of the connection duct, is connected by way of a plug-in connection to a connector-piece receptacle of the adapter piece. It is of advantage here that simple assembly is made possible. It is furthermore of advantage that the plug-in connection is executable as a counter bearing of a pivot bearing.

It may be provided here that the connector-piece receptacle is configured as a pivot bearing for the connector piece. Here, it is of advantage that a pivotable fastening of the connector piece can be executed on both sides. The connector piece can thus be axially fixed in relation to the pivot axis, the pivoting movement being enabled in an unencumbered manner.

It is particularly favorable here for the plug and the connector region of the connector piece to be aligned coaxially in relation to one another. It is of advantage here that a common pivot axis can be defined.

In one embodiment of the invention it may be provided that in each case one hose receptacle for connecting the cold-water hose end piece and the warm-water hose end piece is configured in the adapter piece. It is of advantage here that no sealed termination is required on the base plate for the cold-water hose end piece and for the warm-water hose end piece.

For the purpose of fixing the hose end pieces, it may be provided that an insertable securing plate is arranged on the base plate. This securing plate is preferably insertable in a transverse manner to an insertion direction of the cold-water hose end piece and of the warm-water hose end piece. It is of advantage here that the hose end pieces can be executed having annular projections or grooves which, for the purpose of fixing, can be engaged by the securing plate from behind, in the insertion direction.

In one embodiment of the invention it may be provided that at least one connection duct which runs obliquely in relation to a longitudinal axis and which connects the connector assembly to the base-plate receptacle is configured in the adapter piece. It is of advantage here that the connections can be routed from the base-plate receptacle to the connector assembly and thus onward to the single-lever mixing cartridge. Preferably, two connection ducts for the two supply hoses, and a further connection duct for the discharge to the outlet mouthpiece, are configured in the adapter piece. Due to connection ducts being configured in the adapter piece, adapting the standardized base-plate receptacle to different connector assembly for different types of single-lever mixing cartridges is made possible.

In one embodiment of the invention it may be provided that the connector-piece receptacle is assigned a connection duct of the first type which opens out to the connector assembly and/or the hose receptacles are in each case assigned one connection duct of the second type which opens out to the connector assembly. It is of advantage here that the hose connectors can be routed to the single-lever mixing cartridge.

It may be provided here that the connection duct of the first type runs inside the adapter piece in a crosswise manner to the connection ducts of the second type. This special routing of the connection ducts inside the adapter piece enables the connector piece, in the installed position, to be arranged on that side of the sanitary fixture that faces the outlet mouthpiece. This is because the commercially available single-lever mixing cartridges have the trait that the supply ports, in the installed position, are arranged on that side which faces the outlet mouthpiece, whereas the discharge of the single-lever mixing cartridge is arranged on that side which faces away from the outlet mouthpiece, i.e. is arranged behind the supply ports. It is achieved by way of the crosswise arrangement that this discharge to the pivotable connector piece is routed past the supply ports.

In one embodiment of the invention it may be provided that the hose connector is configured as a hose nipple or an olive. It is of advantage here that a connection hose can be connected in a simple and reliable manner.

In one embodiment of the invention it may be provided that the hose receptacles and/or the connector-piece receptacle have/has in each case one seal ring. It is advantageous here that a tight discharge of the water-carrying system, which simultaneously maintains ability of movement of the connector piece, is made possible.

In one embodiment of the invention it may be provided that a clearance which delimits an available pivot angle for the connector piece is configured on the base plate and/or the connector piece. It is of advantage here that space is created for the pivoting movement. The clearance is preferably configured to be wedge-shaped in order to provide a defined maximum pivot angle.

In one embodiment of the invention it may be provided that an anti-rotation device is configured on the base plate. For example, this may be a non-circular anti-rotation device. It is advantageous here that an entrained rotation of the sanitary fixture can be prevented when a pivot arm of a sanitary fitting is pivoted.

It may be provided in one embodiment of the invention that the base plate and/or the adapter piece are/is made of plastic. It is of advantage here that simple shaping of the individual parts of the sanitary fixture is made possible. This facilitates production and lowers production costs. The base plate and/or the adapter piece may also be made of metal in order to, for example, achieve a longer service life.

Alternatively or additionally, it may be provided that the securing plate is made of metal. It is of advantage here that a reliable, wear-resistant retention of the cold-water hose end pieces and the warm-water hose end pieces is made possible. The securing plate may also be made of plastic in order to save production costs and/or to avoid corrosion.

The sanitary fixture may thus be made entirely of plastic or entirely of metal, or production can be implemented in which individual parts are made from plastic and the remaining parts are made of metal or another material, for example wood or other renewable resources.

In order to achieve the object mentioned at the outset it is provided, according to the invention, in an inner-hose arrangement for a sanitary fitting having a sanitary fixture, that a flexible connection hose is attached or attachable to the sanitary fixture. The inner-hose arrangement according to the invention preferably has a sanitary fixture according to the invention, in particular such as described above. It is of advantage here that the inner-hose arrangement can be easily installed in the comparatively tight conditions of a sanitary fitting, since the flexible connection hose, if and when required, can be bent during installation. It is further of advantage that the flexible connection hose permits, within certain limits, a pivoting movement of a pivot arm carrying an outlet mouthpiece. Preferably, the connection hose is connected to the hose connector of the sanitary fixture according to the invention. It is particularly favorable here for the connection hose to be releasably connected in order to make possible its replacement.

In one embodiment of the invention it may be provided that an outlet mouthpiece is connected to an end of the connection hose that faces away from the hose connector. It is of advantage here that a ready-for-installation inner-hose arrangement is provided. It is particularly favorable here for the outlet mouthpiece to be releasably connected.

It may be provided here that a maximum outer dimension of the outlet mouthpiece is adapted to a maximum outer dimension of the connector piece. It is of advantage here that the connector piece can be guided through an opening into which the outlet mouthpiece fits. This facilitates assembly of the pre-assembled inner-hose arrangement in a sanitary fitting, where the outlet mouthpiece is inserted into an outlet opening through which the connector piece has previously been guided.

In one embodiment of the invention it may be provided that the connection hose has at least one axial portion which can be varied in length and/or can be kinked. It is of advantage here that the position and/or length of the connection hose, after assembly on the pre-assembled inner-hose arrangement, can be easily adapted to the conditions of the sanitary fitting. For example, it may be provided that the axial portion is folded in a bellows-like manner.

In order to achieve the object in a sanitary fitting of the type described at the outset, it is provided according to the invention that the outlet mouthpiece is connected to the single-lever mixing cartridge by a flexible connection hose. It is of advantage here that a simple assembly of the inner-hose arrangement is made possible. It is further of advantage that a pivoting movement of the outlet mouthpiece in relation to the single-lever mixing cartridge is made possible, for example by pivoting a pivot arm of the sanitary fitting.

It is particularly favorable for the connection hose to be configured as a component of an inner-hose arrangement according to the invention, in particular as described above. In this manner, the described advantages can be combined with one another.

The connection hose may be made of, for example, PEX (cross-linked polyethylene) or polyamide or another plastic.

In one embodiment of the invention it may be provided that the outlet mouthpiece is arranged on a pivot arm. The merits of a flexible inner-hose arrangement and of a pivotable fastening of a connection hose on a sanitary fixture can thus be utilized to make possible the pivoting movement.

BRIEF DESCRIPTION OF THE DRAWINGS

The invention will now be described in more detail by means of exemplary embodiments, but is not limited to these exemplary embodiments. Further exemplary embodiments emerge by combining with one another the features of individual or of a plurality of claims and/or with individual or a plurality of features of the exemplary embodiments.

In the drawings.

DETAILED DESCRIPTION OF THE PREFERRED EMBODIMENTS

Figure 1:
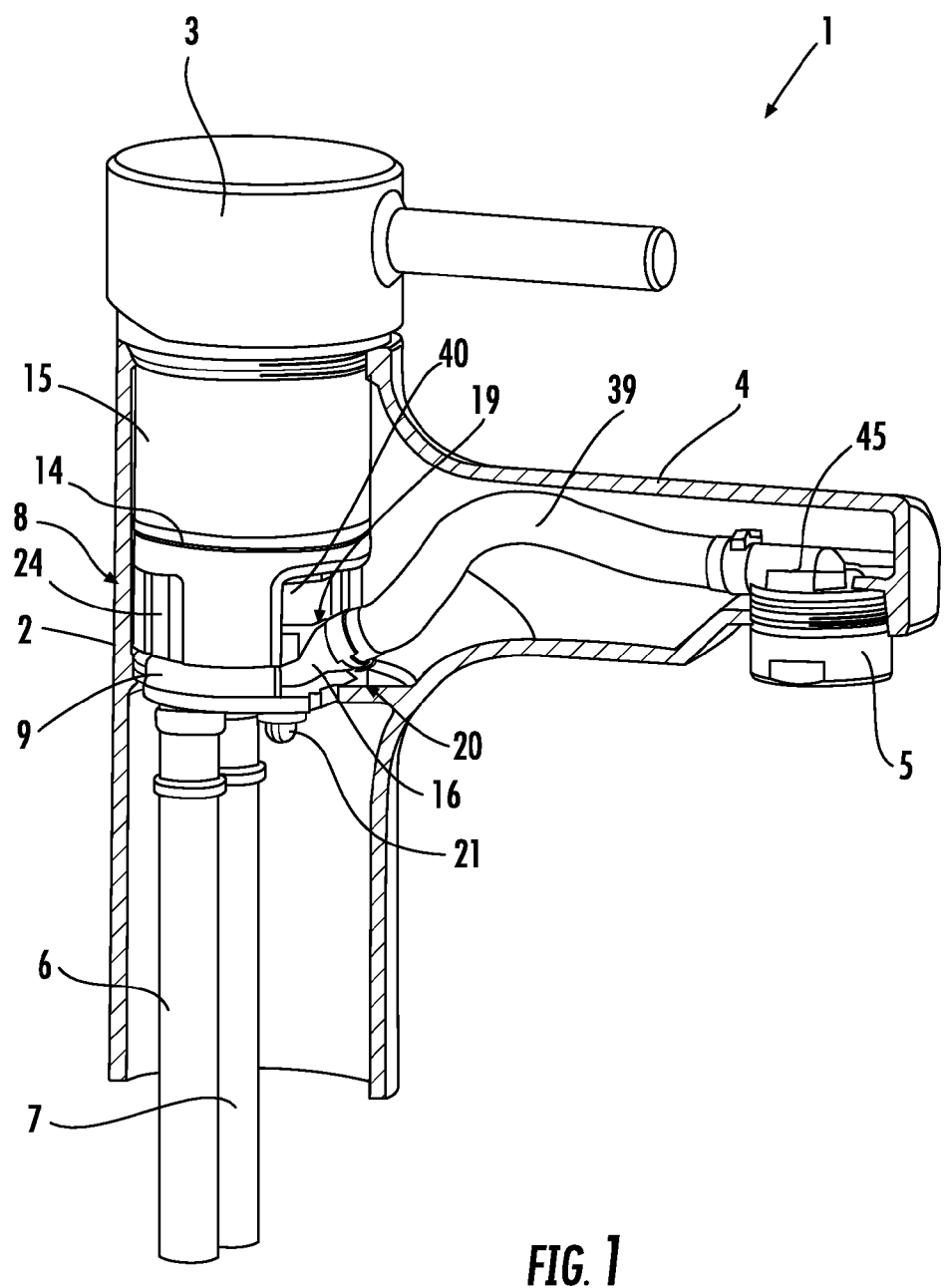
FIG. 1 shows a sanitary fitting according to the invention having an assembled sanitary fixture according to the invention.

FIG. 1 shows a sanitary fitting which, in its entirety, is marked with reference sign 1.

The sanitary fitting 1 has a fitting body 2 and a hand lever 3.

An outlet mouthpiece 5 is arranged in a fixed arm 4.

A cold-water hose 6 and a warm-water hose 7 are introduced from below into the fitting body 2.

The amount and the mixing ratio of warm water to cold water at the outlet mouthpiece 5 can be adjusted by way of the hand lever 3.

To this end, a sanitary fixture 8 according to the invention, which is shown and described in more detail in FIGS. 4 to 8, is inserted into the fitting body 2 of the sanitary fitting 1.

The sanitary fixture 8 has a base plate 9 in which a first receptacle 10 (cf. FIG. 4) for a cold-water hose end piece 11 is configured.

The cold-water hose 6 can thus be introduced into the first receptacle 10.

The base plate 9 has a second receptacle 12 into which a warm-water hose end piece 13 of the warm-water hose 7 can be introduced.

The receptacles 10, 12 are configured as holes or other cylindrical openings.

In the use position, a connector assembly 14 in the form of a planar connector surface is configured on the upper side of the sanitary fixture 8.

The connector assembly 14 is disposed and configured such that a single-lever mixing cartridge 15 can be attached in a tight manner.

A connector piece 16 is pivotably arranged on the base plate 9. The connector piece 16 has a continuous inner duct 17 (see FIGS. 5 and 6), which, at a first end 18 of the connector piece 16, opens out to the connector assembly 14 in a manner yet to be described in more detail.

At a second end 19, the inner duct 17 opens out into a hose connector 20.

Figure 12:
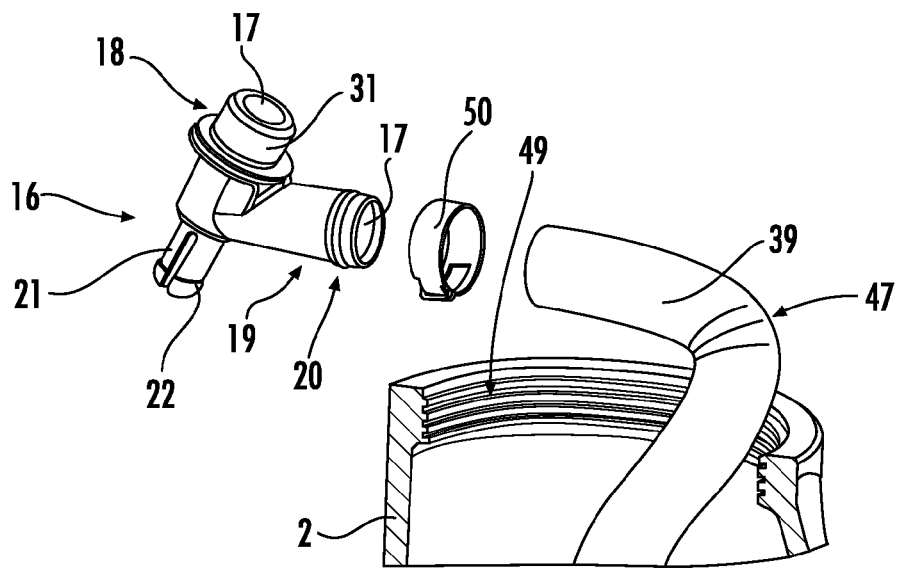

FIG. 12 shows the connector piece 16 separate from the other components.

It can be seen that the inner duct 17 is guided at an acute angle between the first end 18 and the second end 19.

On the connector piece 16, a plug 21 is configured in an extension of the first end 18. The plug 21 is executed in a slotted manner and has a latching cam 22. In the use position, the plug 21 can be inserted into a plug receptacle 23 of the base plate, where it latches by way of the latching cam 22 with the base plate 9.

The plug receptacle 23 thus forms a pivot bearing of the connector piece 16.

The pivot axis of this pivot bearing is aligned parallel to the longitudinal axis of the sanitary fixture 8, which runs from top to bottom in FIG. 1.

This is achieved in that the plug receptacle 23 is aligned parallel to this longitudinal axis.

An adapter piece 24 is inserted between the base plate 9 and the single-lever mixing cartridge 15.

On a first side 25, the lower side, this adapter piece 24 has a base-plate receptacle 26.

The base-plate receptacle 26 is configured in a complementary manner to the upper side 27 of the base plate 9, such that the shape of the base-plate receptacle 26 matches the shape of the upper side 27.

The connector assembly 14 which has already been mentioned is configured on a second side 28, on the upper side of the adapter piece 24.

The single-lever mixing cartridge 15 can thus be attached in a tight manner to the second side 28.

Projections 29 which engage in corresponding recesses 30 on the upper side 27 of the base plate 9 are configured on the first side 25, in order to prevent unintentional rotation of the adapter piece 24 in relation to the base plate 9.

In a connector region 31 containing the first end 18 of the inner duct 17, the connector piece 16 is connected by way of a plug-in connection to a connector-piece receptacle 32 of the adapter piece 24.

The connector region 31 and the connector-piece receptacle 32 form a pivot bearing.

The plug 21 and the connector region 31 are coaxially aligned in relation to one another, such that the plug 21 with the plug receptacle 23 and the connector region 31 with the connector-piece receptacle 32 define the pivot bearing of the connector piece 16.

Figure 4:
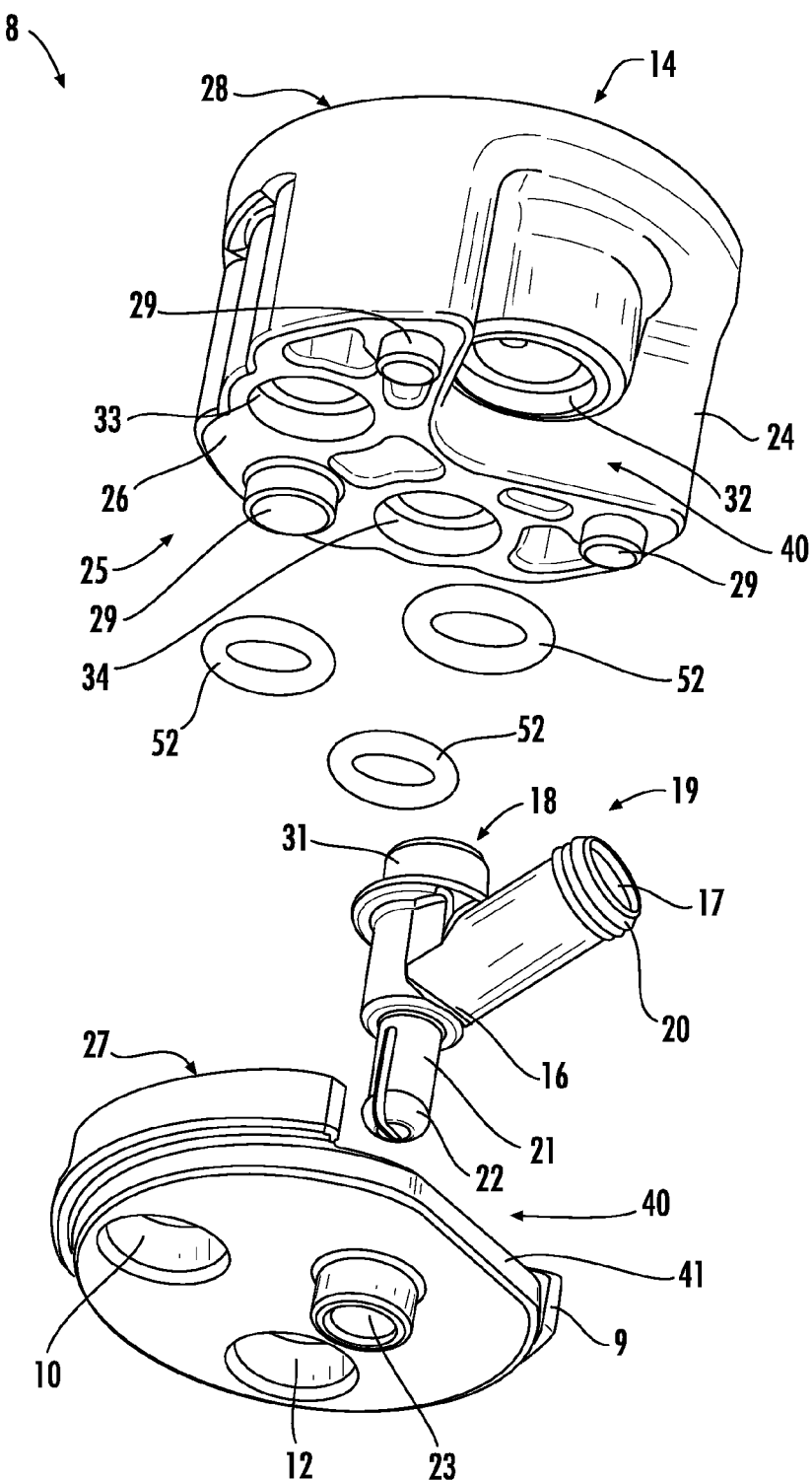
FIG. 4 shows an exploded view of a sanitary fixture according to the invention.
Figure 5:
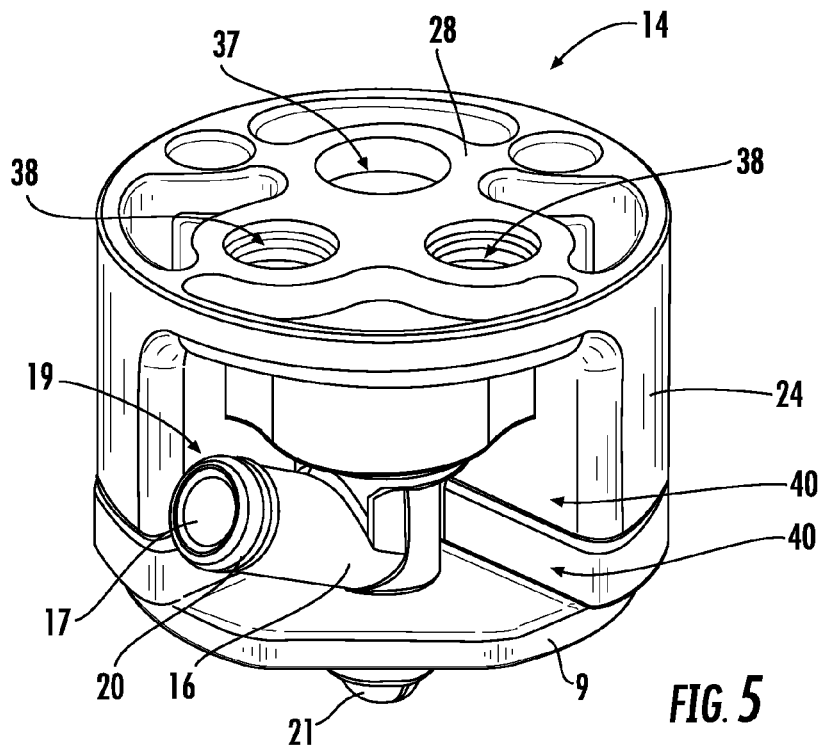
FIG. 5 shows the sanitary fixture according to the invention according to FIG. 4 having a connector piece which is aligned in one direction.
Figure 6:
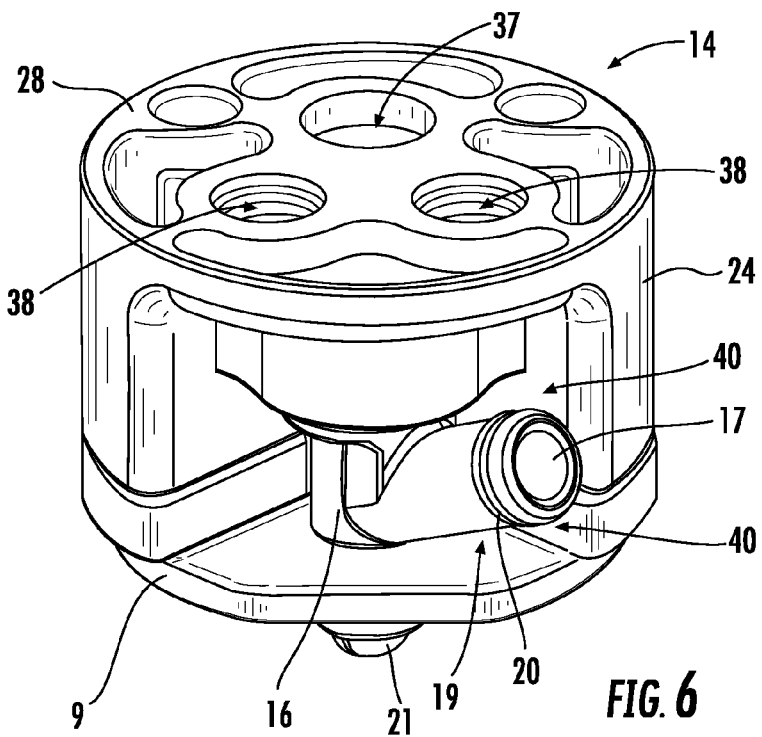
FIG. 6 shows the sanitary fixture according to FIG. 5 having a connector piece which is pivoted in another direction.

It can be seen in FIG. 4 that a hose receptacle 33 for the cold-water hose end piece 11 and a hose receptacle 34 for the warm-water hose end piece 13 are configured in the adapter piece.

Figure 13:
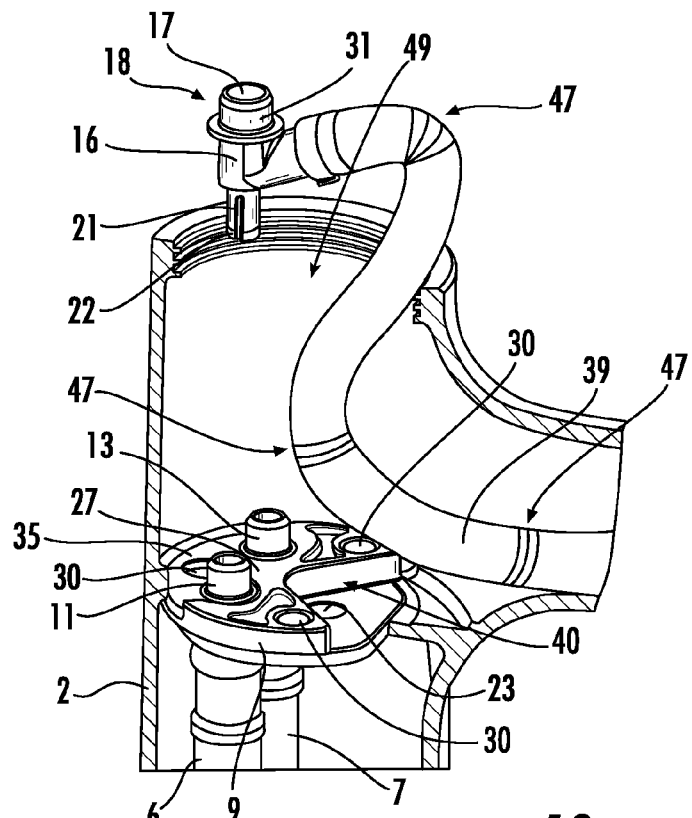
Figure 14:
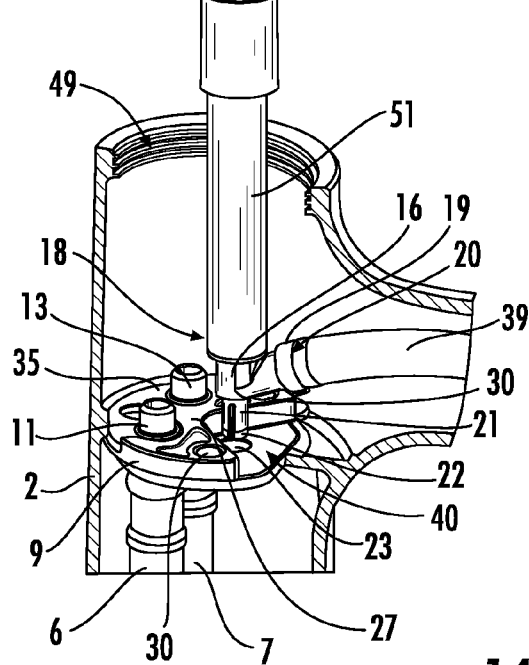

It can furthermore be seen in FIG. 13 that the cold-water hose end piece 11 and the warm-water hose end piece 13 are pushed through their respective receptacles 10, 12 in the base plate 9.

Subsequently, to safeguard against dropping out, a securing plate 35 is inserted transversely to the insertion direction of the hose end pieces 11, 13 into the base plate 9.

From behind, this securing plate 35 engages with annular projections 36 on the hose end pieces 11, 13.

Figure 9:
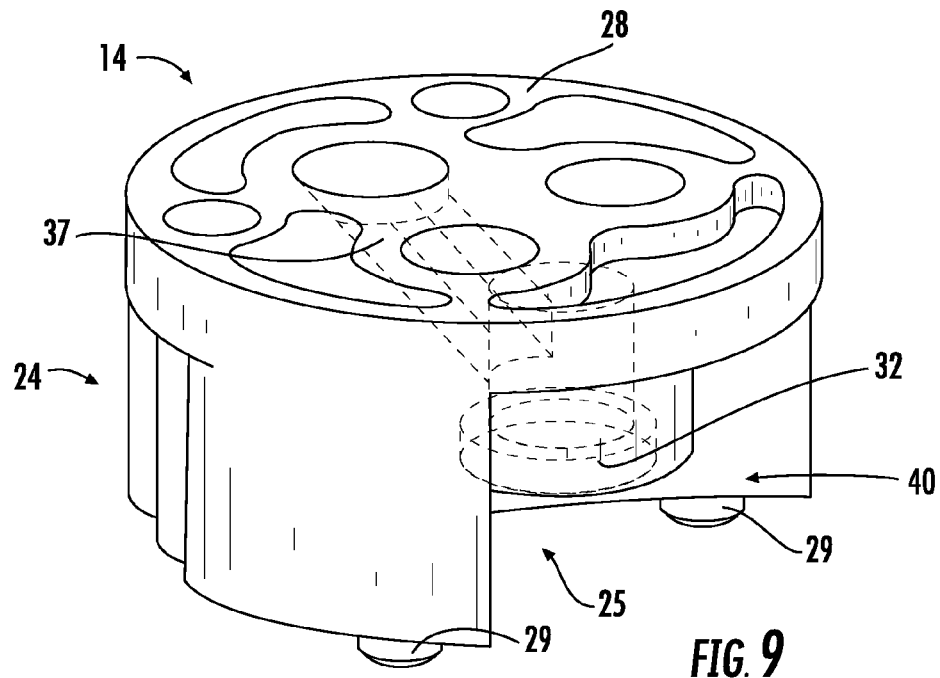
FIG. 9 shows the adapter piece according to FIG. 7 having, incorporated in the drawing, a connection duct of the first type.
Figure 10:
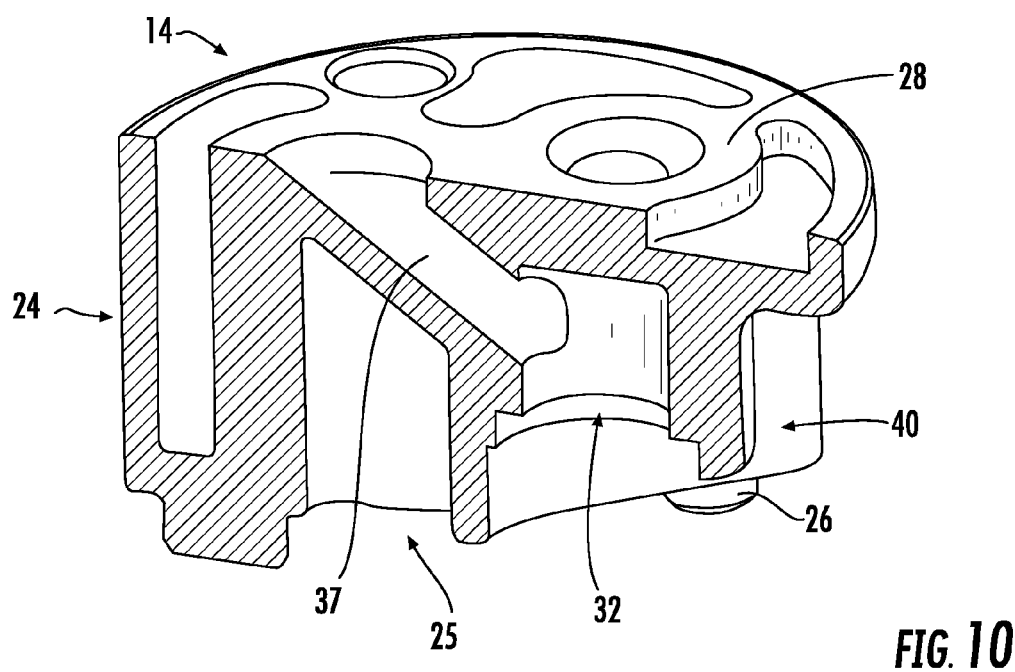
FIG. 10 shows a sectional view of the adapter piece according to FIG. 9, FIGS. 11 to 16 show assembly steps in an assembly according to the invention of an inner-hose arrangement according to the invention.

It can be seen in FIGS. 9 and 10 that a connection duct of the first type 37 is routed in the interior of the adapter piece 24 from the connector-piece receptacle 32 to the connector assembly 14.

In the use position, the connector piece 16 is connected to the single-lever mixing cartridge 15 via this connection duct of the first type 37.

Figure 7:
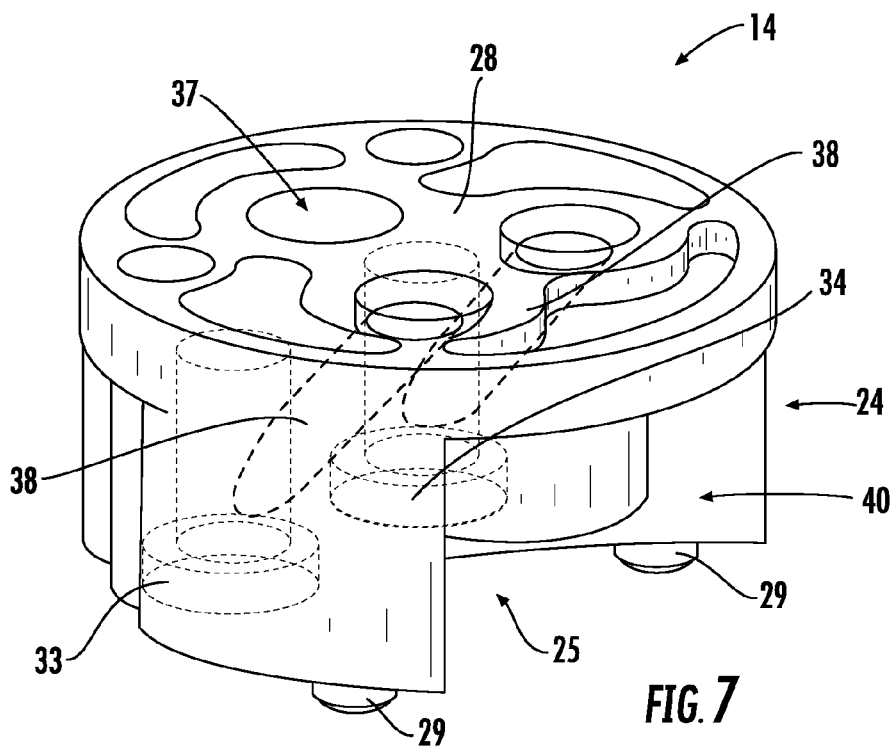
FIG. 7 shows the configuration of connection ducts of the second type in the adapter piece of the sanitary fixture according to FIGS. 4 to 6.
Figure 8:
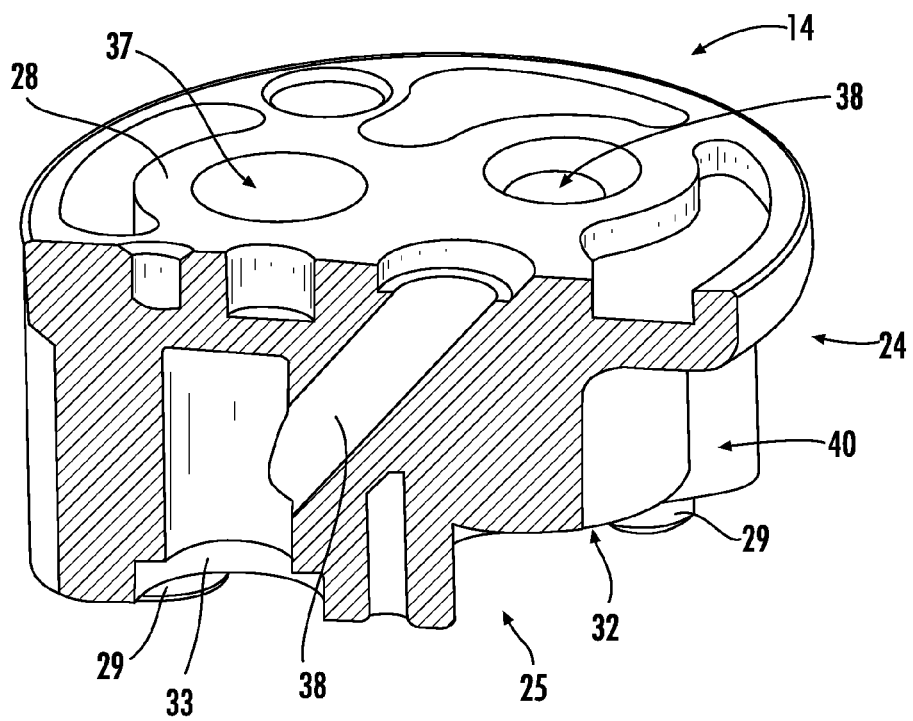
FIG. 8 shows the adapter piece according to FIG. 7 in a sectional view.

It can be seen in FIGS. 7 and 8 that the hose receptacles 33, 34 are in each case routed via a connection duct of the second type 38 to the connector assembly 14.

The connection ducts 37, 38 are in each case configured in the interior of the adapter piece 16 and run obliquely in relation to the longitudinal axis of the sanitary fixture 8.

Here, the connection duct of the first type 37 is routed between the connection ducts 38 and is cross-wise to them.

Thus, the exit port of the single-lever mixing cartridge 15 is routed past the entry ports of the single-lever mixing cartridge 15, such that the connector piece 16 can be arranged on that side of the sanitary fixture 8 that faces the outlet mouthpiece 5.

In the exemplary embodiment described, the hose connector 20 is configured as a hose nipple or an olive.

A connection hose 39, on the free end of which the outlet mouthpiece 5 is fastened, is pushed onto the hose connector 20.

In further exemplary embodiments, the hose connector 20 may also be configured as a recess, into which a connection hose, which, on its other hose end, is connected to the outlet mouthpiece, is plugged.

A wedge-shaped clearance 40 is configured on the base plate 9 and on the adapter piece. The clearance 40 delimits the available pivot angle for the connector piece 16.

A non-circular anti-rotation device 41 in the form of a flattening is also configured on the base plate 9. This anti-rotation device 41 will be described in more detail in the context of FIGS. 2 and 3.

Figures 2, 3:
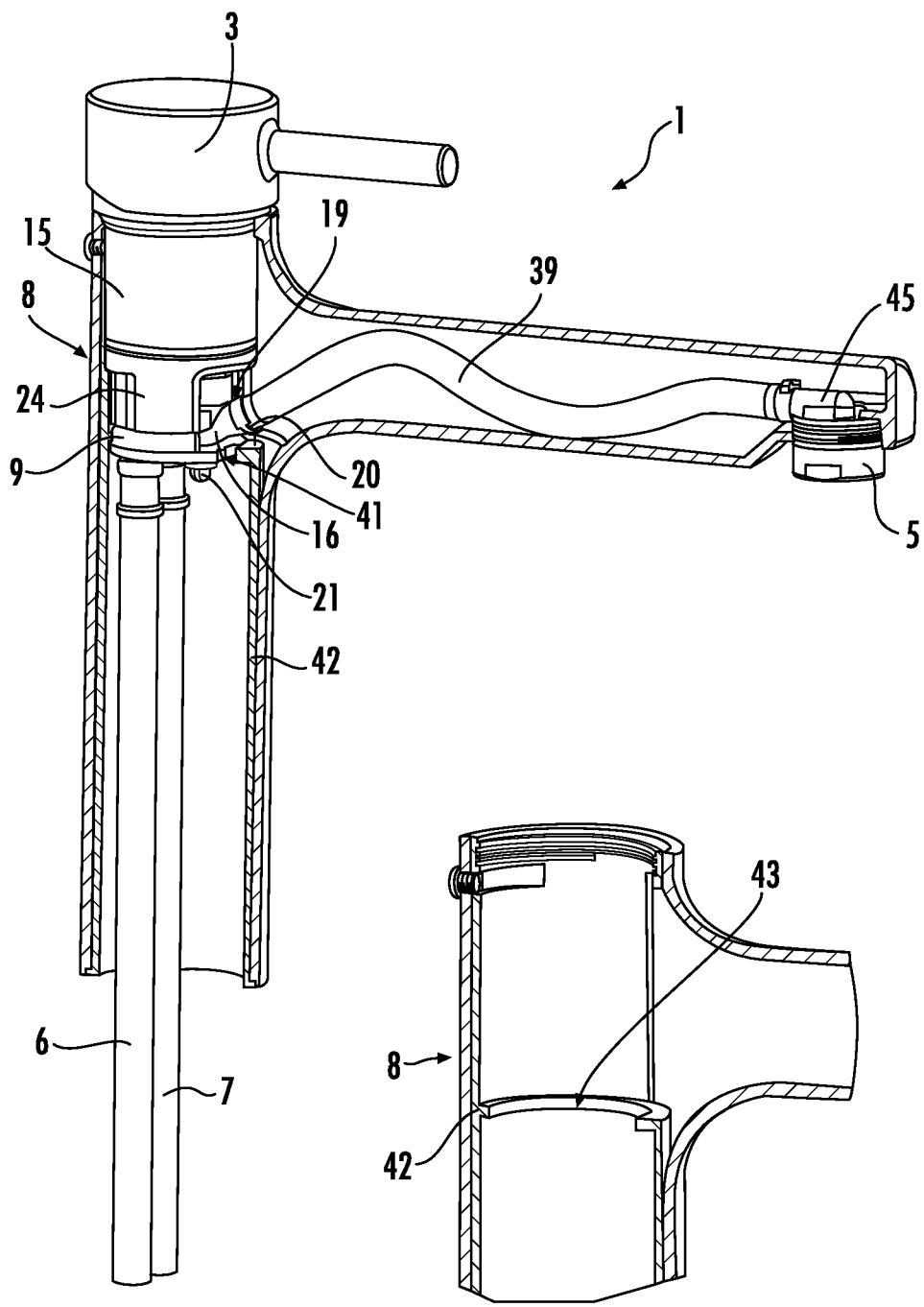
FIG. 2 shows a further sanitary fitting according to the invention having a pivot arm and an assembled sanitary fixture according to the invention.
FIG. 3 shows a detail of the sanitary fitting according to FIG. 2.

FIG. 2 and FIG. 3 show a further exemplary embodiment of a sanitary fitting 1 according to the invention. Components and functional units which are identical and/or similar in terms of construction and/or function to the preceding exemplary embodiment are marked with the same reference signs and are not specifically described once again. The previous statements thus correspondingly apply.

The sanitary fitting 1 according to FIG. 2 and FIG. 3 differs from the previously described exemplary embodiment in that the arm 4 is configured as a pivot arm. To this end, a stationary pipe 42, about which the pivot arm 4 can be pivoted, is arranged in the interior of the sanitary fitting 1.

The pivoting range which can be attained is limited in a manner which is known per se.

The base plate 9 is inserted into an opening 43 which has a non-circular contour. By way of the anti-rotation device 41, the contour of the base plate 9 is adapted to match the opening 43. The anti-rotation device 41, in the exemplary embodiment, is configured as a flattening. In other exemplary embodiments, also projections or recesses are configured in order to provide a non-circular contour as an anti-rotation device 41.

The base plate 9 thus cannot rotate in the stationary opening 43. As a result, the entire construction on the base plate 9 remains stationary when the pivot arm 4 is pivoted. Only the connector piece 16 follows the pivoting movement.

In the exemplary embodiments described, the base plate 9 and the adapter piece 16 are made of plastic, whereas the securing plate 35 is made of metal.

Figure 17:
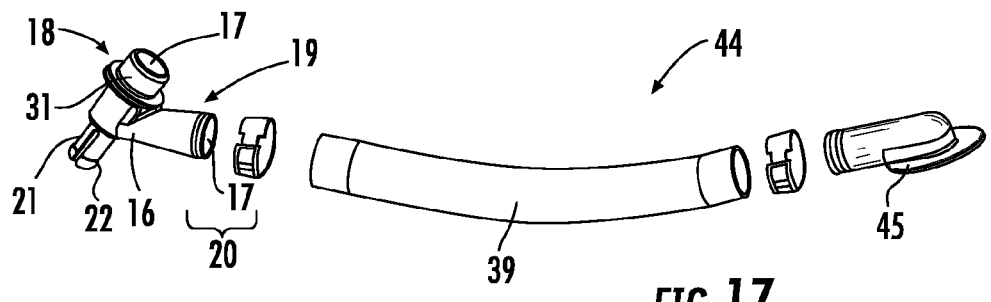
FIG. 17 shows a further inner-hose arrangement according to the invention in an exploded view.
Figure 18:
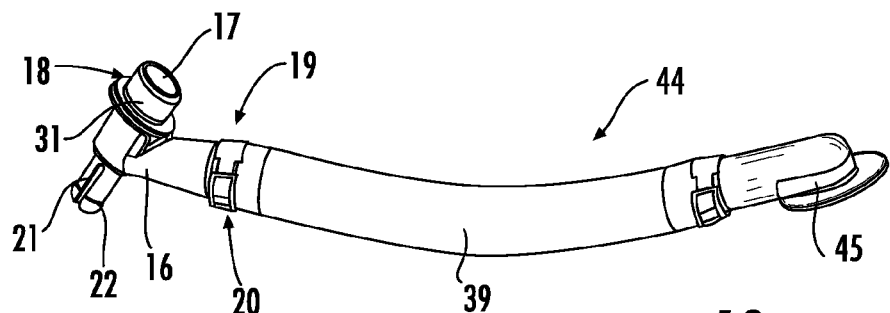
FIG. 18 shows the inner-hose arrangement according to FIG. 17 in the pre-assembled state.
Figure 19:
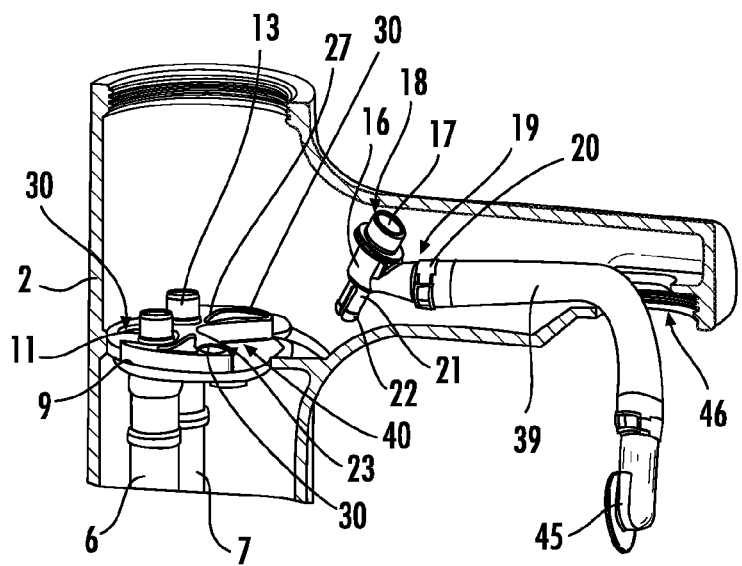
FIGS. 19 to 23 show assembly steps in an assembly of the inner-hose arrangement according to FIG. 18.

FIGS. 17 and 18 show an inner-hose arrangement 44 according to the invention for a sanitary fitting 1 which has a sanitary fixture 8 and a flexible connection hose 39.

The connection hose 39 is releasably connected to a connector flange 45 for the outlet mouthpiece 5 and to the connector piece 16.

During assembly, the connector flange 45 and the outlet mouthpiece 5 are placed in an outlet opening 46 of the arm 4.

The maximum outer dimension of the outlet mouthpiece 5 and thus the unobstructed width of the outlet opening 46 here are adapted to the maximum outer dimension of the connector piece 16, such that the connector piece 16 can be inserted through the outlet opening 46.

In order to have available sufficient freedom of movement, the connection hose 39 has a plurality of axial portions 47 which are folded in a bellows-like manner. By way of these axial portions 47, the connection hose, if and when required, can be reversibly varied in length and can be kinked.

A common feature of the described exemplary embodiments is that the sanitary fitting 1 has a single-lever mixing cartridge 15, a first receptacle 10 for a cold-water hose end piece 11 and a second receptacle 12 for a warm-water hose end piece 13 and an outlet mouthpiece 5. The outlet mouthpiece 5 here is connected to the single-lever mixing cartridge 15 via a connection piece 16 by a flexible connection hose 39.

Mention has yet to be made that one seal ring 52 is in each case inserted into the hose receptacles 33, 34 and into the connector-piece receptacle 32, cf. FIG. 4.

FIGS. 11 to 16 show a first assembly sequence for an inner-hose arrangement 44 according to the invention, in the event that the outlet opening 46 is too narrow for the connector piece 16.

Figure 11:
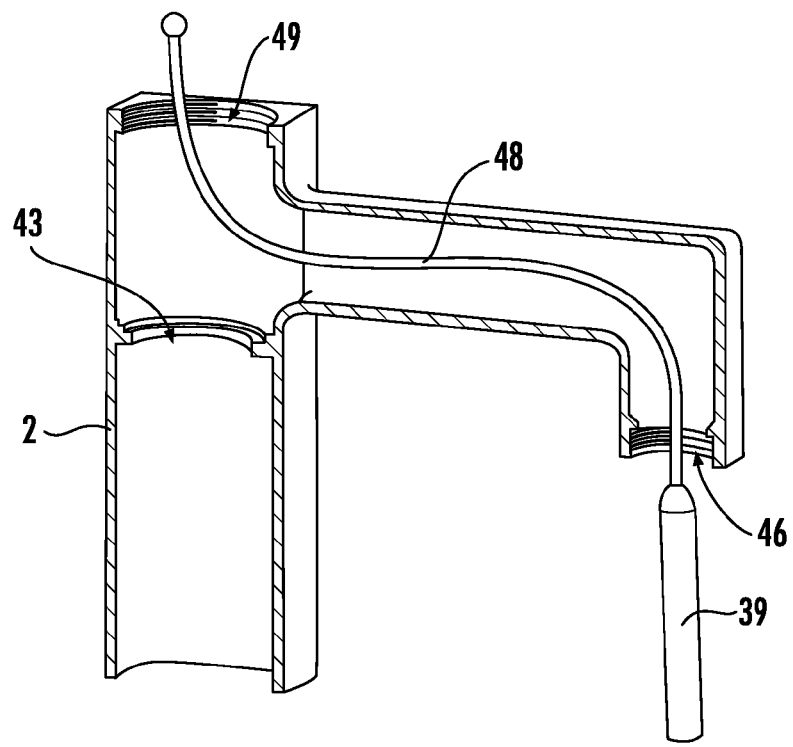

First, the connection hose 39, using a flexible threading aid 48, is guided through the outlet opening 46 into the fitting body 2 and from there out through the mixer opening 49, FIG. 11.

Subsequently, the connector piece 16 is fastened on the connection hose 39 by way of a hose clamp 50, FIG. 12.

In a next step, the base plate 9 is inserted through the mixer opening 49 into the opening 43. Now, the connector piece 16 is inserted into the mixer opening 49.

In this process, the connection hose 39 is reversibly kinked at the provided axial portions 47, FIG. 13.

The plug 21 is plugged into the plug receptacle 23. A rod-shaped tool 51 is used here, FIG. 14.

Figure 15:
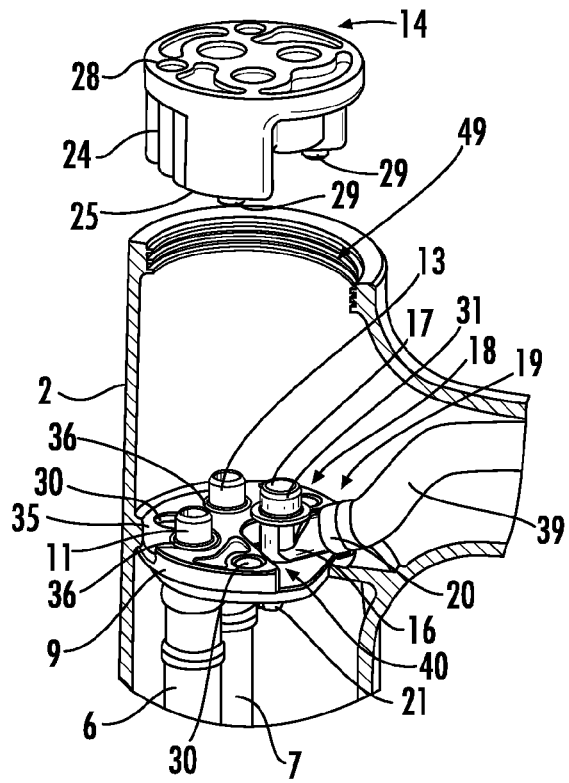

Now, the adapter piece 24 is inserted through the mixer opening 49 and attached onto the base plate 9, FIG. 15.

Subsequently, the single-lever mixing cartridge 15 is inserted into the mixer opening 49 and fastened, FIG. 16.

The excess length of the connection hose 39 here is accommodated by the axial portions 47 and/or by way of a meandering routing of the hose.

FIGS. 19 to 23 show an alternative possibility of installing an inner-hose arrangement 44 according to the invention as per FIGS. 17 and 18 in a sanitary fitting 1.

It can be seen from FIGS. 17 and 18 that the maximum outer dimension of the connector piece 16 is smaller than the maximum outer dimension of the connector flange 45. The connector piece 16 thus fits through any opening into which the connector flange 45 with the outlet mouthpiece 5 can be inserted.

In a first step, the inner-hose arrangement 44 is pre-assembled: The connector piece 16 and the connector flange 45 are connected to the connection hose 39, FIG. 18.

In a second step, the inner-hose arrangement 44 is threaded through the outlet opening 46 into the fitting body 2. Here, the connector piece 16 is guided in first, FIG. 29. The base plate 9 here has already been placed into the opening 43 and connected to the hose end pieces 11, 13.

Figure 20:
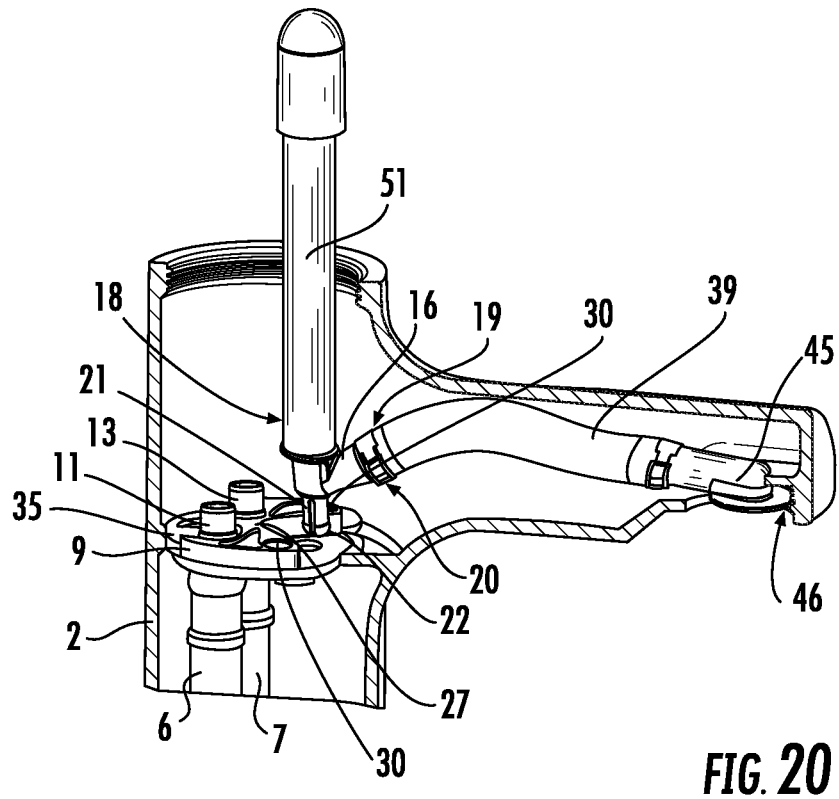

Subsequently, the connector piece is gripped at the connector region 31 using the rod-shaped tool 51, FIG. 20.

Figure 21:
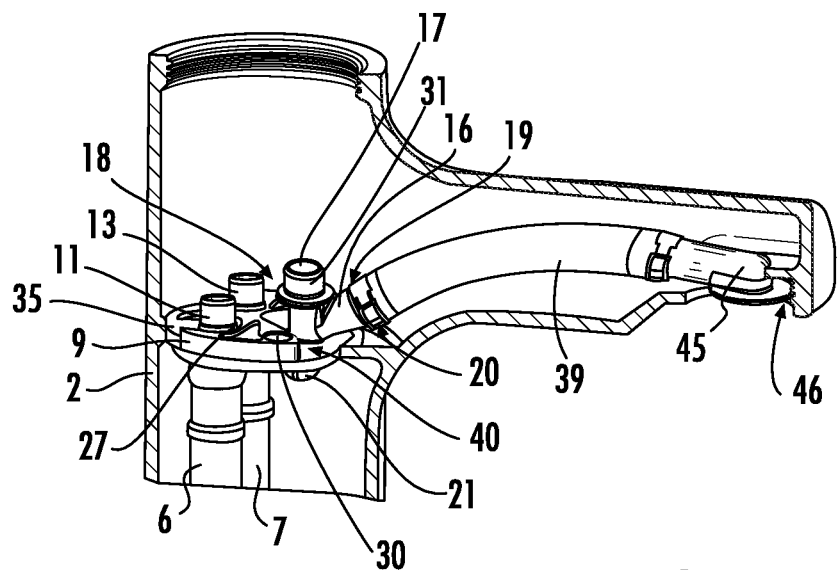

Now, the plug 21 is plugged into the plug receptacle 23, FIG. 21.

Figure 22:
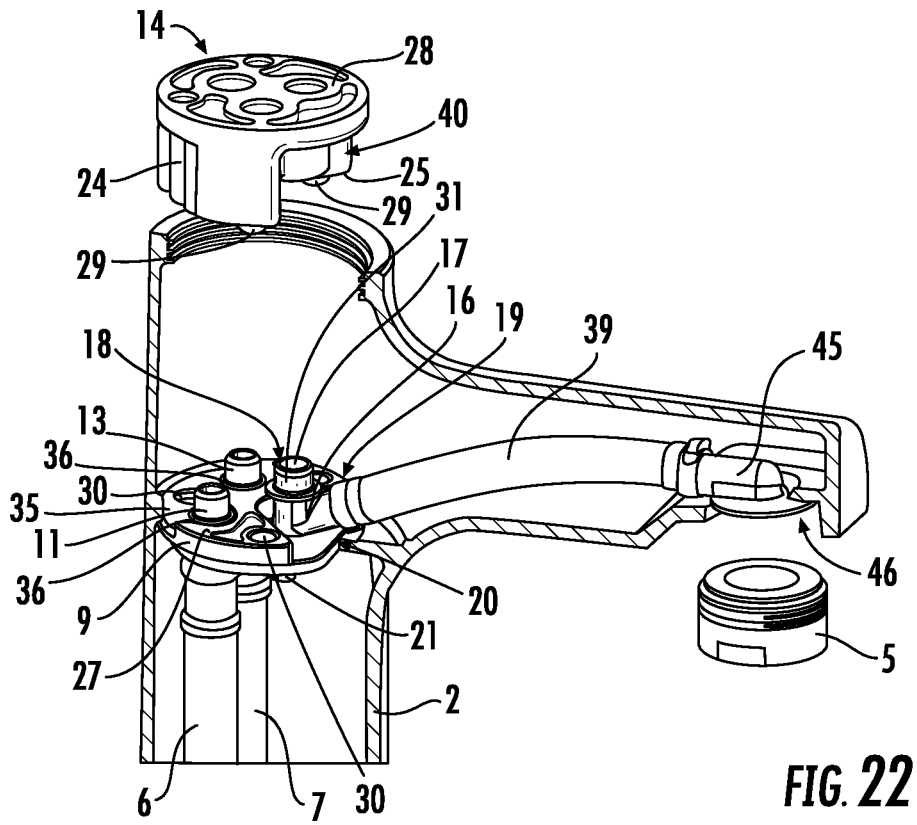

The length of the connection hose 39 is dimensioned such that the connector flange 45 lies against the inside of outlet opening 46 once the plug 21 has been plugged into the plug receptacle 23, FIG. 22.

Figure 16:
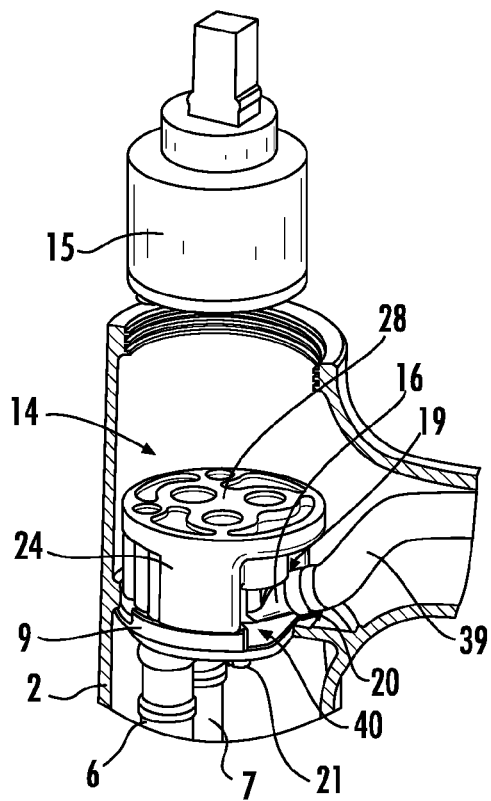
Figure 23:
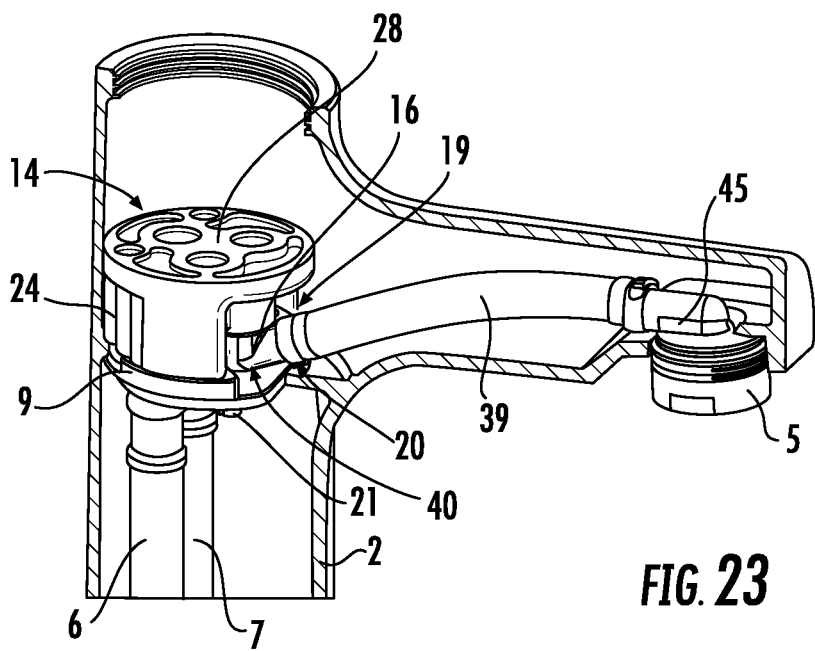

Finally, the outlet mouthpiece 5 is screwed in, FIG. 23, and the single-lever mixing cartridge 15 is inserted into the mixer opening 49 (cf. FIG. 16).

In a sanitary fixture 8 having a connector assembly 14 for the connection to a single-lever mixing cartridge 15 it is proposed to pivotably arrange a connector piece 16 having a hose connector 20 on a base plate 9, wherein the base plate 9 has receptacles 10, 12 for a cold-water hose end piece 11 and a warm-water hose end piece 13.

LIST OF REFERENCE SIGNS

1 Sanitary fitting
2 Fitting body
3 Hand lever
4 Arm
5 Outlet mouthpiece
6 Cold-water hose
7 Warm-water hose
8 Sanitary fixture
9 Base plate
10 First receptacle
11 Cold-water hose end piece
12 Second receptacle
13 Warm-water hose end piece
14 Connector assembly
15 Single-lever mixing cartridge
16 Connector piece
17 Inner duct
18 First end
19 Second end
20 Hose connector
21 Plug
22 Latching cam
23 Plug receptacle
24 Adapter piece
25 First side
26 Base-plate receptacle
27 Upper side
28 Second side
29 Projection
30 Recess
31 Connector region
32 Connector-piece receptacle
33, 34 Hose receptacle
35 Securing plate
36 Projection
37 Connection duct of first type
38 Connection duct of second type
39 Connection hose
40 Clearance
41 Anti-rotation device
42 Pipe
43 Opening
44 Inner-hose arrangement
45 Connector flange
46 Outlet opening
47 Axial portion
48 Threading aid
49 Mixer opening
50 Hose clamp
51 Tool
52 Seal ring

The invention claimed is:

1. A sanitary fixture (8) comprising:
a base plate (9) which has a first receptacle (10) for a cold-water hose end piece (11);
a second receptacle (12) for a warm-water hose end piece (13);
a connector assembly (14) configured for connecting a single-lever mixing cartridge (15), the connector assembly including an adapter piece (24) connected to the base plate (9);
a hose connector (20);
a connector piece (16) pivotably fastened on the base plate (9), the connector piece (16) has an inner duct (17) which, at a first end (18), opens out to the connector assembly (14) and, at a second end (19), opens out to the hose connector (20), the connector piece (16), in a connector region (31) including the first end (18) of the inner duct (17), is connected via a plug-in connection to a connector-piece receptacle (32) of the adapter piece (24); and
the connector-piece receptacle (32) of the connector assembly (14) opens out into a first connection duct (37), which extends in the adapter piece (24) crosswise to a second connection duct in the adapter piece (24).

2. The sanitary fixture (8) as claimed in claim 1, wherein the inner duct (17) is routed at an angle between the first end (18) and the second end (19).

3. The sanitary fixture (8) as claimed in claim 1, wherein a plug (21) which is at least one of slotted or provided with a latching cam (22) and which, together with a matching plug receptacle (23) of the base plate (9), forms a pivot bearing is provided on the connector piece (16).

4. The sanitary fixture (8) as claimed in claim 1, wherein the adapter piece (24) has a first side (25) with a base-plate receptacle (26) for the base plate (9) and, on a second side (27), a connection for the single-lever mixing cartridge.

5. The sanitary fixture (8) as claimed in claim 4, wherein the connector-piece receptacle (32) is configured as a pivot bearing for the connector piece (16) and the plug (21) and the connector region (31) of the connector piece (16) are aligned coaxially in relation to one another.

6. The sanitary fixture (8) as claimed in claim 1, wherein in each case one hose receptacle (33, 34) for connecting the cold-water hose end piece (11) and the warm-water hose end piece (13) is configured in the adapter piece (24).

7. The sanitary fixture (8) as claimed in claim 6, wherein a securing plate (35) which is insertable in a transverse manner to an insertion direction of the cold-water hose end piece (11) and of the warm-water hose end piece (13) is arranged on the base plate (9).

8. The sanitary fixture (8) as claimed in claim 7, wherein the securing plate (35) is made of metal.

9. The sanitary fixture (8) as claimed in claim 6, wherein two of the second connection ducts are provided, the hose receptacles (33, 34) are in each case assigned a respective one of the second connection ducts (38) which opens out to the connector assembly.

10. The sanitary fixture (8) as claimed in claim 6, wherein the hose connector (20) is configured as a hose nipple, and at least one of the hose receptacles (33, 34) or the connector-piece receptacle (32) have in each case one seal ring (52).

11. The sanitary fixture (8) as claimed in claim 1, wherein a wedge-shaped clearance (40) which delimits an available pivot angle for the connector piece (16) is configured on at least one of the base plate (9) or the adapter piece (24).

12. The sanitary fixture (8) of claim 1, wherein a non-circular anti-rotation device (41) is configured on the base plate (9).

13. The sanitary fixture (8) as claimed in claim 1, wherein at least one of the base plate (9) or the adapter piece (24) are made of plastic.

14. An inner-hose arrangement (44) for a sanitary fitting (1) as claimed in claim 1, further comprising a flexible connection hose (39) connected to the hose connector (20).

15. The inner-hose arrangement (44) as claimed in claim 14, wherein an outlet mouthpiece (5) is connected to an end of the connection hose (39) that faces away from the hose connector (33, 34).

16. The inner-hose arrangement (44) as claimed in claim 15, wherein a maximum outer dimension of the outlet mouthpiece (5) is adapted to a maximum outer dimension of the connector piece (16).

17. The inner-hose arrangement (44) as claimed in claim 14, wherein the connection hose (39) has at least one axial portion (47) which is at least one of variable in length or kinkable.

* * * * *